E. W. BRETTELL.
Tumblers for Permutation Locks.

No. 145,618. Patented Dec. 16, 1873.

Attest:                          Inventor;
M. H. Chandler         E. W. Brettell
C. D. Phelan           per. J. P. Town
                                          attorney

UNITED STATES PATENT OFFICE.

EDWARD W. BRETTELL, OF NEW HAVEN, CONNECTICUT.

IMPROVEMENT IN TUMBLERS FOR PERMUTATION-LOCKS.

Specification forming part of Letters Patent No. 145,618, dated December 16, 1873; application filed May 3, 1873.

CASE C.

*To all whom it may concern:*

Be it known that I, EDWARD W. BRETTELL, of New Haven, in the county of New Haven and State of Connecticut, have invented certain new and useful Improvements in Permutation-Locks; and I do hereby declare the following to be a full, clear, and exact description of the invention, such as will enable others skilled in the art to which it pertains to make and use it, reference being had to the accompanying drawings, which form part of this specification.

This invention relates to an improvement in that class of locks in which the tumblers are formed by encircling an inner ring or wheel with an elastic stop-ring, which is generally held in position by its friction upon the inner ring; and it consists in so forming the elastic stop-ring as to give it a bearing at three points within a groove which encircles the inner ring, at two of which points, namely, those nearest the opening in the stop-ring, a series of triangular teeth are formed which lock into corresponding teeth formed in the bottom of the groove which encircles the inner ring, the parts being constructed and arranged as hereinafter more fully described.

Figure 1:
Figure 2:
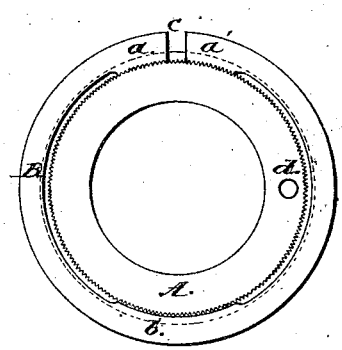

Figure 1 presents a diametrical section of the tumbler. Fig. 2 is a view of the tumbler, partly in section.

It will be seen that the inner ring A is formed with a groove, in which the elastic stop-ring B is placed. The bottom of this groove is provided with a series of triangular teeth or serrations, as is clearly shown in Fig. 2 of the drawing. An orifice, *d*, is also formed in the inner ring, which admits of the introduction of a carrying-pin, by which the tumbler is revolved. The stop-ring B is made of an elastic material, (preferably steel,) and is cut open at *c*. It is also cut away upon its inner surface, so as to leave but three bearing-points, two of which are serrated, as shown at *a a'*; the other, *b*, presenting a smooth surface, which shall form no greater obstruction to the movement of the ring than is due to the friction of the parts in moving upon each other.

In order to set the stop-ring at any desired point upon the ring A, a key of proper form is forced into the opening *c* in the stop-ring, thus spreading it sufficiently to raise the teeth *a a'* out of the serrations in the groove of the ring A, when the latter may be turned so as to bring any desired part of its periphery opposite the opening in the ring B.

I am aware that lock-tumblers have been constructed having that portion of the tumbler which performs the functions of the ring A roughened upon its peripheries. This I do not claim, for this method of construction only increases the friction of one part upon the others, but does not securely lock them together until released by spreading the outer ring, as is done by the serrated grooves and bearings in my improved tumbler.

Having thus described my invention, I claim as new, and desire to secure by Letters Patent—

A lock-tumbler consisting of a central part, A, provided with a serrated periphery and orifice, *d*, and an elastic stop-ring, B, having serrated bearings *a a'* and smooth bearing *b*, all combined and arranged as and for the purpose specified.

In testimony that I claim the foregoing I have hereunto set my hand this 23d day of April, 1873.

E. W. BRETTELL.

Witnesses:
 M. K. CHANDLER,
 C. D. IRELAN.